United States Patent [19]

Hora et al.

[11] Patent Number: 5,154,372
[45] Date of Patent: Oct. 13, 1992

[54] TORQUE MULTIPLIER FOR AIRCRAFT PROPELLER

[75] Inventors: Peter Hora, West Chester; David E. Bulman; Thomas C. Hermans, both of Cincinnati, all of Ohio; Thomas G. Wakeman, Lawrenceburg, Ind.; Walter D. Howard, Cincinnati, Ohio

[73] Assignee: General Electric Company, Cincinnati, Ohio

[21] Appl. No.: 556,676

[22] Filed: Jul. 23, 1990

[51] Int. Cl.⁵ .................... F01D 1/24; F04D 29/26
[52] U.S. Cl. ...................... 244/62; 416/129; 416/160
[58] Field of Search ............ 416/147, 160, 128, 129; 244/17, 19, 17.25, 62

[56] References Cited

U.S. PATENT DOCUMENTS

| | | | |
|---|---|---|---|
| 2,541,636 | 2/1951 | Chillson | 170/160.28 |
| 2,664,960 | 1/1954 | Laongfellow | 170/160.2 |
| 3,536,415 | 10/1970 | Kusiak | 416/160 |
| 3,647,320 | 3/1972 | Chilman | 416/157 |
| 3,672,788 | 6/1972 | Ellinger | 416/13 |
| 3,866,415 | 2/1975 | Ciokajlo | 60/226 |
| 3,893,789 | 7/1975 | Andrews | 416/160 |
| 3,902,822 | 9/1975 | Andrews et al. | 416/160 |
| 3,910,721 | 10/1975 | McMurtry | 416/160 |
| 3,912,418 | 10/1975 | Andrews et al. | 416/174 |
| 3,922,852 | 12/1975 | Drabek | 60/226 |
| 3,964,839 | 6/1976 | Kusiak | 416/160 |
| 3,994,128 | 11/1976 | Griswold, Jr. | 60/226 |
| 4,047,842 | 9/1977 | Avena et al. | 416/152 |
| 4,521,158 | 6/1985 | Fickelscher | 416/160 |
| 4,534,524 | 8/1985 | Aldrich | 244/17.25 |
| 4,657,484 | 4/1987 | Wakeman et al. | 416/127 |
| 4,660,437 | 4/1987 | Scott | 74/675 |
| 4,738,589 | 4/1988 | Wright | 416/129 |
| 4,738,590 | 4/1988 | Butler | 416/129 |
| 4,738,591 | 4/1988 | Bulter | 416/129 |
| 4,750,862 | 6/1988 | Barnes et al. | 416/46 |
| 4,762,466 | 8/1988 | Bouiller et al. | 416/147 |
| 4,863,352 | 9/1989 | Hauser et al. | 416/204 R |

FOREIGN PATENT DOCUMENTS

| | | |
|---|---|---|
| 531756 | 1/1941 | United Kingdom . |
| 1296063 | 11/1972 | United Kingdom . |
| 2182397 | 5/1987 | United Kingdom . |

Primary Examiner—Joseph F. Peters, Jr.
Assistant Examiner—Virna Lissi Mojica
Attorney, Agent, or Firm—Jerome C. Squillaro; John R. Rafter

[57] ABSTRACT

The invention concerns aircraft propellers of the variable pitch type. Each propeller blade is carried by a trunnion which is rotatably mounted to a common ring. Each trunnion contains a reduction gear set which is driven by a radial shaft. The reduction gear sets multiply the torque applied by the shafts, thus allowing shafts of reduced diameter to be used. The reduced diameter is important when the shafts must pass through a turbine flowpath, and thus be concealed within turbine blades. The reduced diameter shafts can be easily concealed within turbine blades without redesigning and compromising blade aerodynamics.

12 Claims, 13 Drawing Sheets

TORQUE MULTIPLIER FOR AIRCRAFT PROPELLER

The invention relates to pitch change mechanisms for aircraft propellers.

BACKGROUND OF THE INVENTION

FIG. 1 illustrates an aircraft engine 3 of the unducted fan type, in which the invention can be used. Region 6 is shown in FIG. 2, wherein counter rotating turbines 9 (hatched) and 12 (plain) are driven by a hot gas stream 13 provided by a core engine (not shown). The turbines 9 and 12 act as sources of motive power and drive counter rotating fan blades 15 and 18 shown in FIGS. 1 and 2. (The term "counter rotating" means that turbines 9 and 12, as well as blades 15 and 18 which are attached to them, rotate in opposite directions, and also that the turbines and blades are coaxial.)

A view of subregion 21 in FIG. 2 is shown in FIG. 3, and in more detailed form in FIG. 4. The turbine blades which are located in subregion 6B in FIG. 2 are shown schematically in FIG. 3 as blades 28 and shown in detail in FIG. 4. The blades 28 extend between a casing 24 and an inner barrel 92 in FIG. 4. The blades extract energy from the air stream 13 in FIG. 2 and also act as a stiff connecting web between the casing 24 and the barrel 92.

The fan blades 15 in FIG. 3 are supported by a structure which is shown as a ring 22 in FIG. 4, and which is fastened to the casing 24 by brackets 25. During operation, the centrifugal load of the fan blades 15 is carried by the ring 22 as a hoop stress.

The actual structure used is not the circular ring 22 shown in FIG. 4, but is what is termed a polygonal ring 22P shown in FIG. 3A. The polygonal ring 22P includes two types of sections: one type is a blade support section 22B, or "hub." A schematic hub 22B is shown in FIGS. 2 and 5, and includes thrust bearings 109 which transmit the centrifugal load imposed by the fan blade 15 to the ring 22P. The thrust bearings 109 allow pitch change of the blade to occur, as indicated by arrow 23.

The other type of ring section is a connector 22A in FIG. 3A which connects neighboring hubs 22B. The connector 22A includes rails 29 which are in tension because of the centrifugal load of the blades 18.

One type of polygonal ring is described in the U.S. Pat. No. 4,863,352 entitled "Blade Carrying Means," filed by Hauser, Strock, Morris, and Wakeman on Nov. 2, 1984, and having Ser. No. 667,663. This application is hereby incorporated by reference.

In order to cause the pitch change indicated by arrow 23 in FIGS. 2 and 5, a large torque must be applied to the blades 15 and 18. The mechanical source of the torque is located within the turbines 9 or 12 in FIG. 2, such as at a region 104. The torque is transmitted from region 104 to the blade 15 by a shaft 101.

If the large torque required were delivered through shaft 101, the shaft must have a large diameter for structural integrity, system stiffness, and proper response. This large shaft must be concealed within a turbine blade 28 in FIG. 4. Such concealment requires configuring the turbine blades to accommodate factors other than aerodynamic behavior, which is not desirable.

OBJECT OF THE INVENTION

It is an object of the present invention to provide an improved pitch change mechanism for an aircraft propeller.

SUMMARY OF THE INVENTION

In one form of the invention, an annular carrier, such as polygonal ring 22P in FIG. 3A, carries propeller blades. Each blade has a reduction gear set. A shaft drives each gear set for changing pitch. Because the gear sets amplify the torques provided by the shafts, the shafts can be of small diameter, and so can easily be concealed within turbine blades.

DETAILED DESCRIPTION OF THE INVENTION

Simplified Form of the Invention

Figure 3:
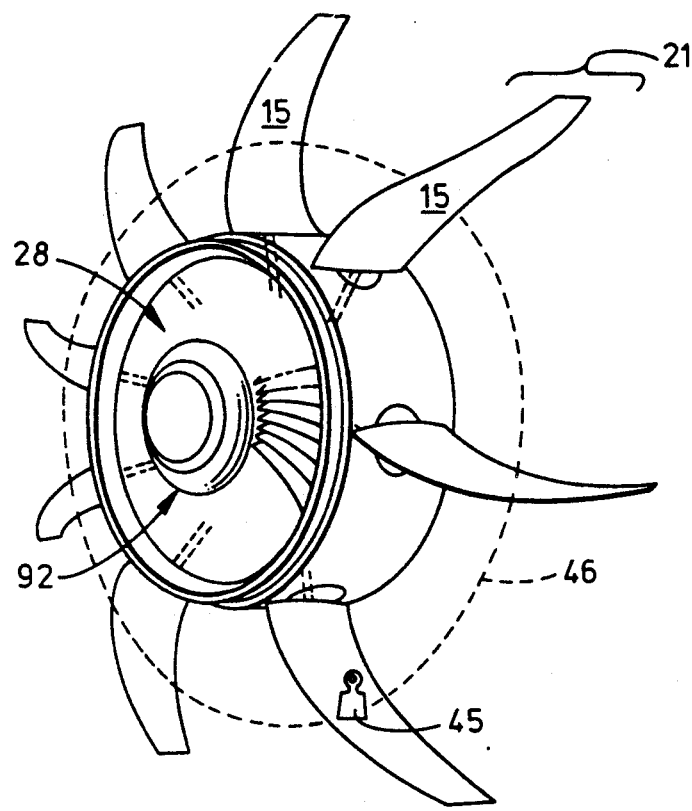
FIG. 3 illustrates a turbine stage of the engine part of FIG. 2.
Figure 3B:
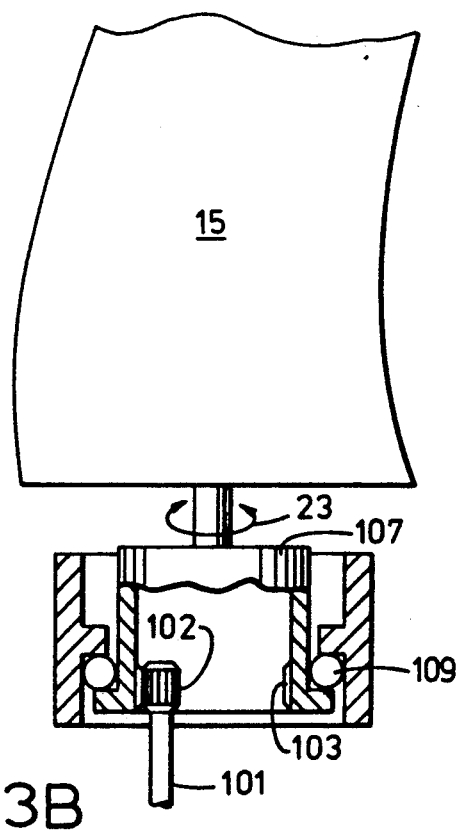
FIG. 3B illustrates one form of the invention.
Figure 3A:
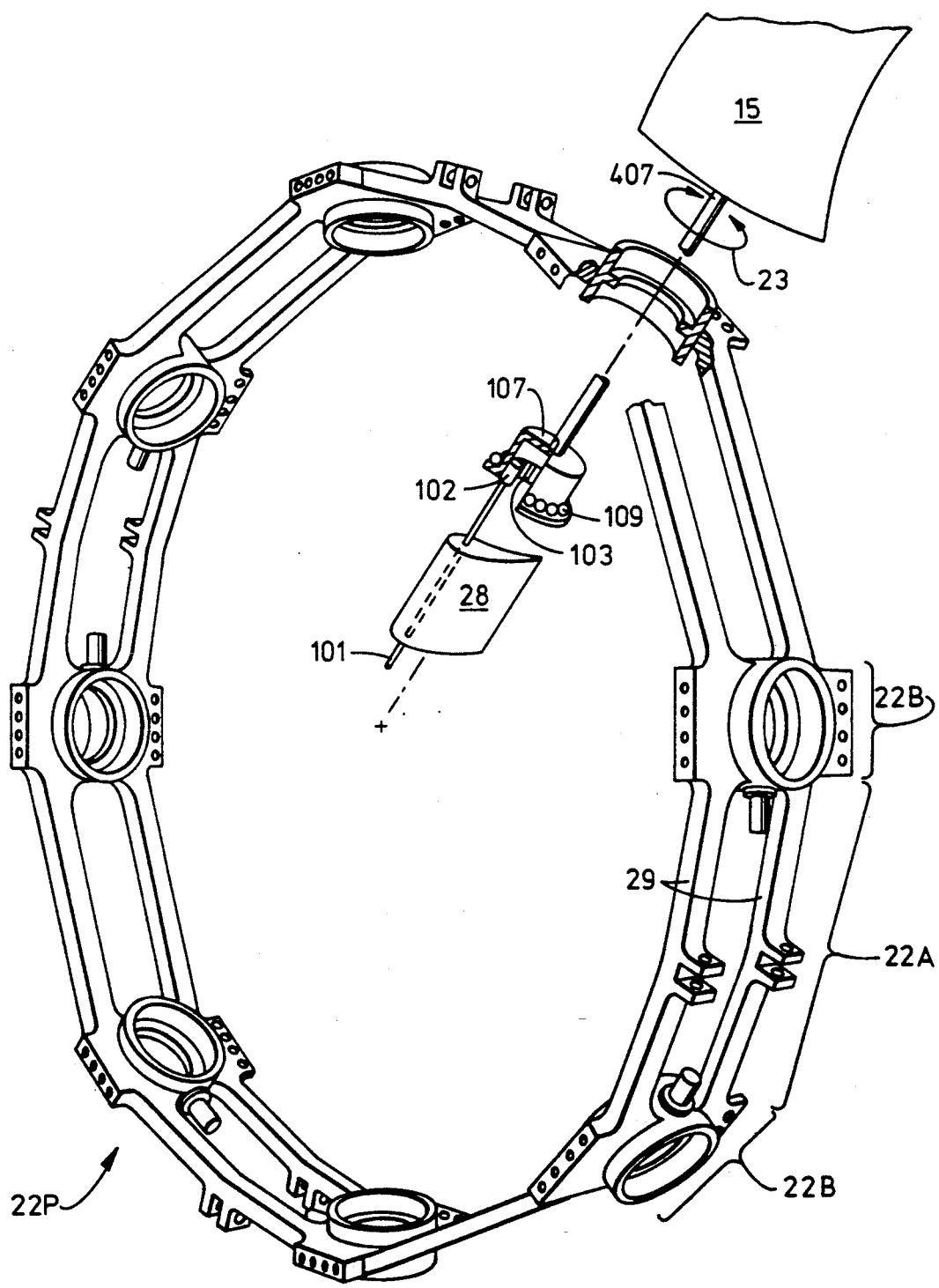
FIG. 3A illustrates one form of the invention.

A simplified form of the invention is shown in FIGS. 3A and 3B. Shaft 101 drives a pinion 102 which engages a ring gear 103. The ring gear is fastened to a trunnion 107 which carries blade 15. Bearings 22D allow rotation of the trunnion 107 in response to rotation of the pinion 102. Because the pinion 102 is smaller in diameter than ring gear 103, the torque provided by shaft 101 is multiplied and the multiplied torque is applied to the trunnion 107.

Figure 1:
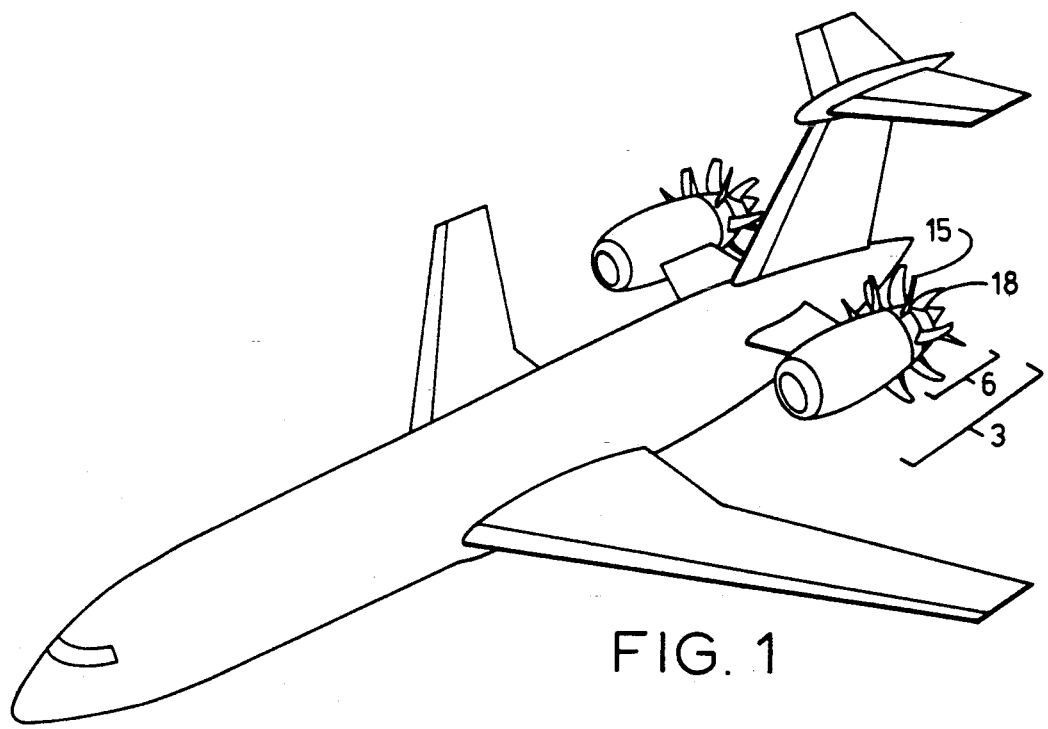
FIG. 1 illustrates an aircraft powered by an engine in which the invention can be used.
Figure 2:
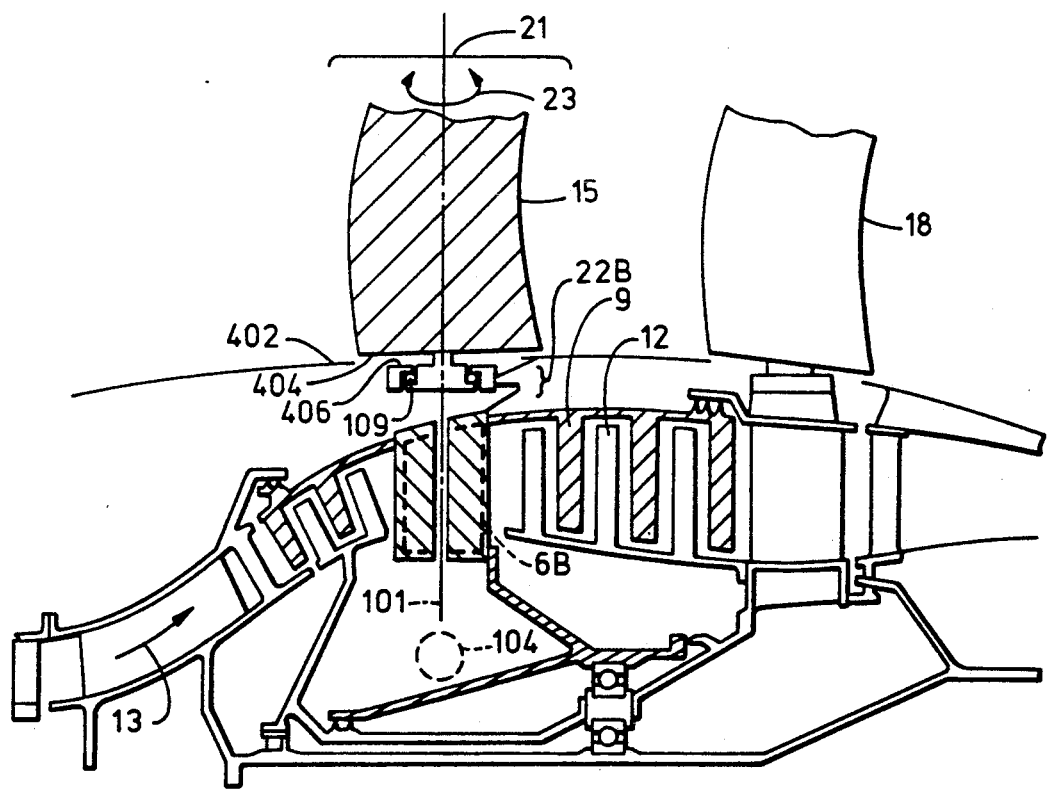
FIG. 2 illustrates in cross-section part of the engine of FIG. 1.

Torque multiplication is desirable because shaft 101 must pass through the turbine flowpath which the hot gases 13 in FIG. 2 follow. The shaft is concealed inside one of the turbine blades 28 in FIGS. 3A and 4. A small diameter shaft carrying a small torque is easier to fit into the blade 28 without re-designing the blade, which would require aerodynamic compromises.

Another Form of the Invention

Figure 6:
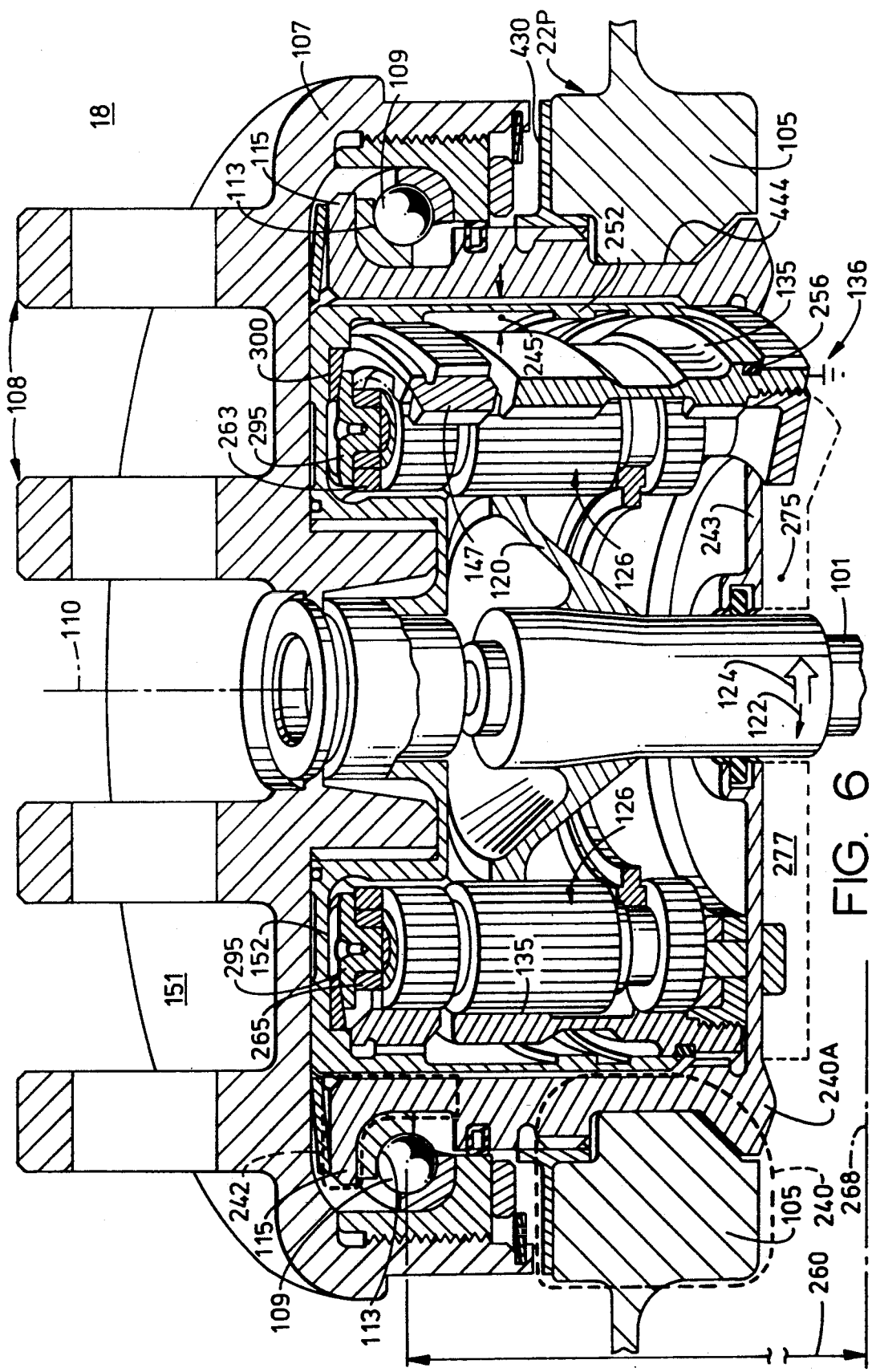
FIG. 6 illustrates one form of the invention.
Figure 6B:
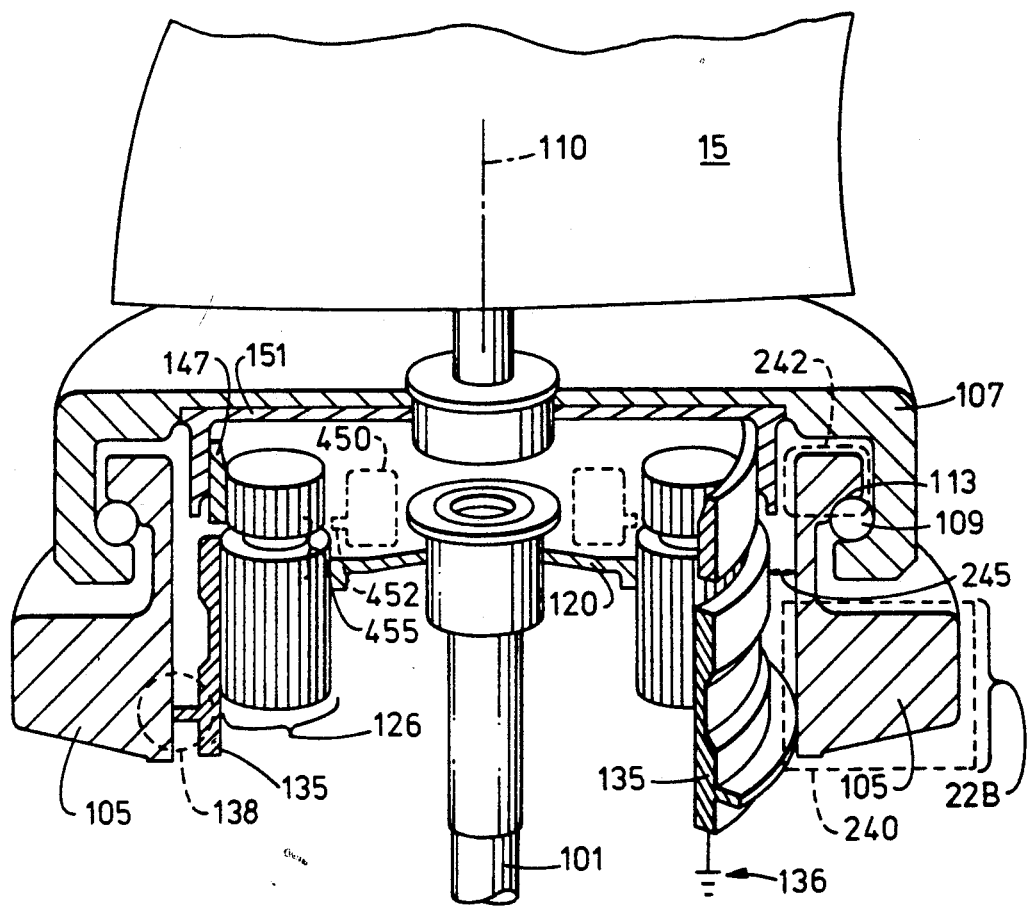
FIGS. 6A and 6B illustrate simplified forms of the invention of the type of FIG. 6.
Figure 6A:
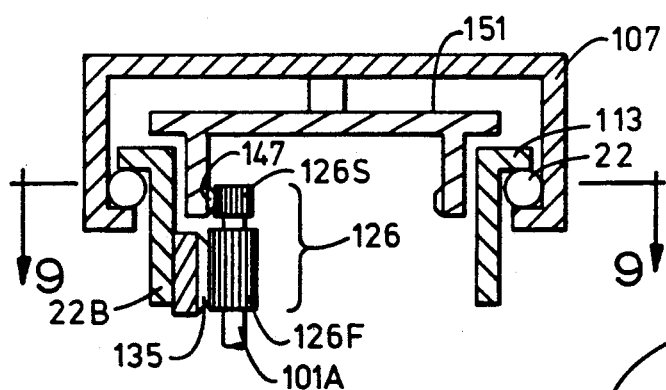

Another form of the invention is shown in FIG. 6A. A compound planet gear 126 having first and second subplanets 126F and 126S, which are locked together, engages two ring gears 135 and 147. Rotation of the planet 126 causes rotation of trunnion 107 with respect to stationary ring gear 135, which is connected to hub region 22B. One explanation of the cause of this rotation is the following.

Figure 9:
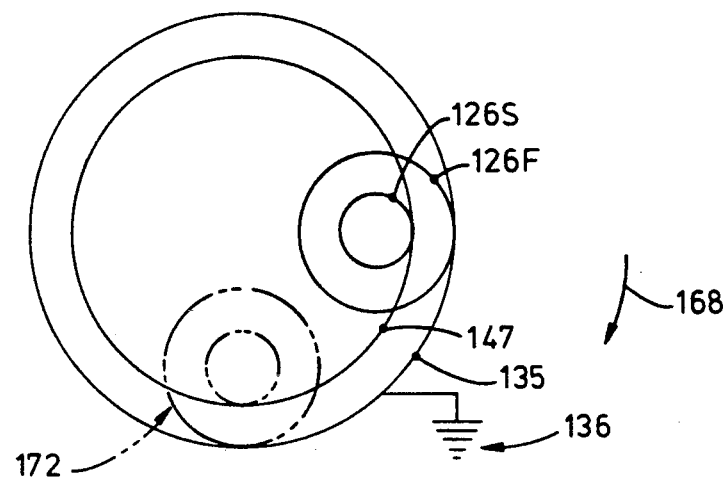
FIG. 9 is a schematic, cross-sectional view of FIG. 6A, taken along arrows 1009.

FIG. 9 is a schematic cross-sectional view of FIG. 6A, taken in the direction of arrows 9—9. The gears in FIG. 6A are shown as circles. To induce a pitch change, compound planet 126 rotates to phantom position 172. Because of the different gear ratios between subplanets 126F and 126S and ring gears 135 and 147, movable ring gear 147 rotates in direction 168, while ring gear 135 remains stationary, as indicated by ground symbol 136. The reason for this rotation of ring gear 147 can be explained with reference to FIG. 10.

Figure 10:
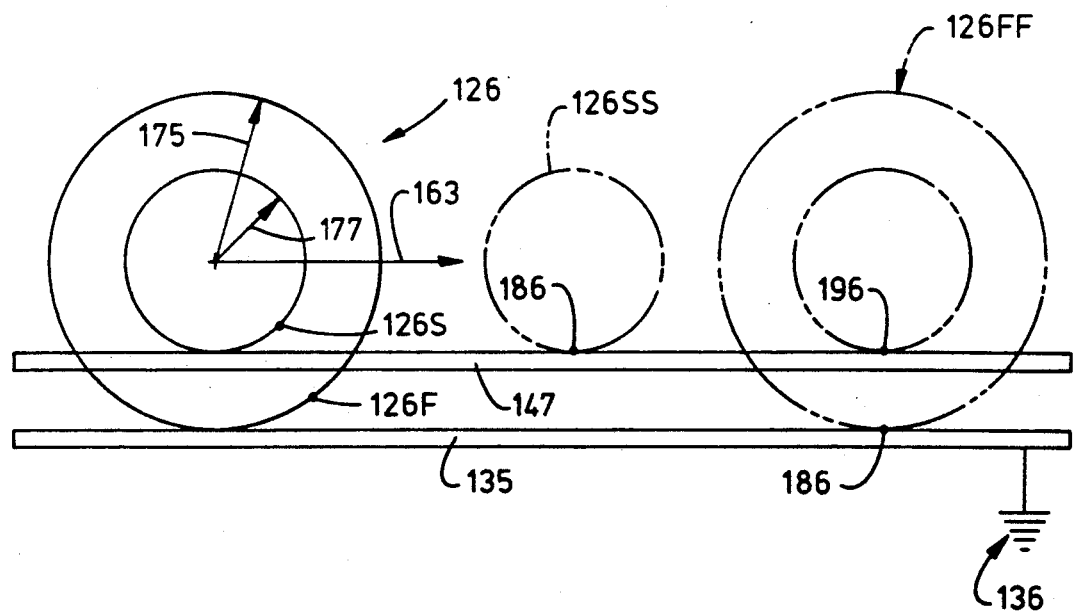
FIG. 10 is an enlarged, schematic view of FIG. 9, in which the ring gears 135 and 147 are shown as having greatly increased, and perhaps infinite, diameters.

In FIG. 10, the stationary ring gear and the movable ring gear are indicated by respective flat surfaces 135 and 147. These flat surfaces can be viewed as ring gears of infinite radii. Compound planet 126 is pulled by force 163, and because of the different radii 175 and 177 of planet subgears 126F and 126S, the moveable ring gear 147 is caused to move in the direction of arrow 206 with respect to the stationary ring gear 135, as will now be explained.

Assume that the sub-planets 126F and 126S are separate, and that each rolls one revolution to the right, landing at respective positions 126FF and 126SS. However, since the sub-planets are locked together, and not separate, sub-planet 126S must remain concentric with sub-planet 126FF: point 186 on movable ring gear 147 is dragged to point 196, and the movable ring gear 147 is also dragged to the right, while fixed ring gear 135 remains stationary. Therefore, rotation of the compound planet 126 induces a relative rotation between the moveable ring gear 147 and the stationary ring gear 135.

Another Form of the Invention

Another form of the invention is shown in FIG. 6B. The gears in FIG. 6B are similar to those in FIG. 6A, but with the addition of a second planet 126, and a sun gear 120 which drives the planets. Fixed ring gear 135 is fastened to component 105 of hub region 22B of the polygonal ring 22P in FIG. 3A. As explained with reference to FIGS. 9 and 10, rotation of compound planets 126 causes relative rotation of movable ring gear 147 with respect to fixed ring gear 135, causing trunnion 107 to rotate on bearings 109. A sun gear 120 in FIG. 6B drives the compound planets 126, unlike the shaft 101A in FIG. 6A, which drives them directly.

Figure 7:
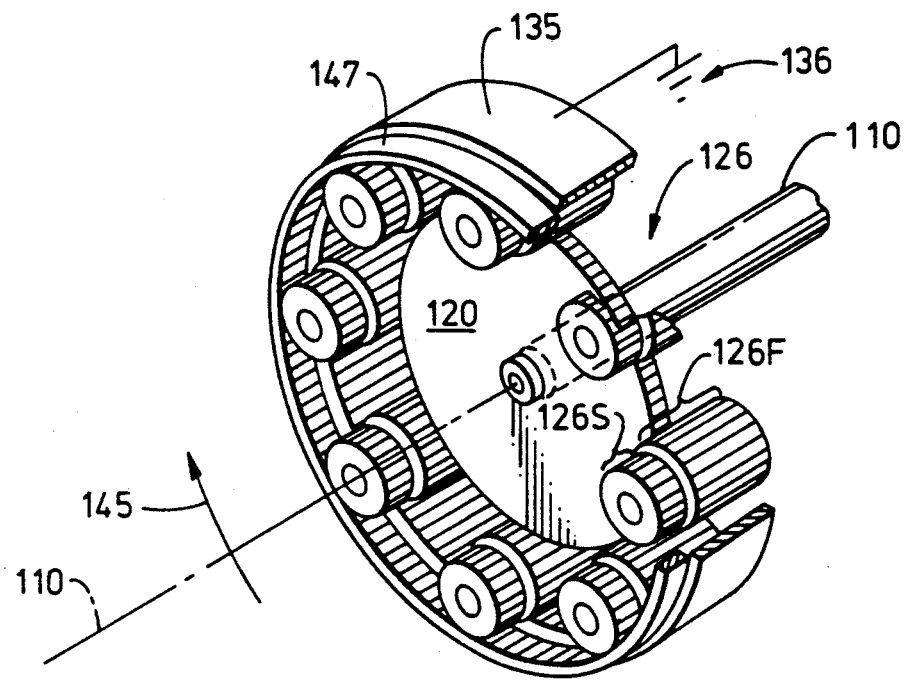
FIG. 7 is a simplified view of part of FIG. 6.

While only two planets 126 are shown in FIG. 6B, a plurality are actually used, such as shown in FIG. 7.

Another Form of the Invention

Figure 6C:
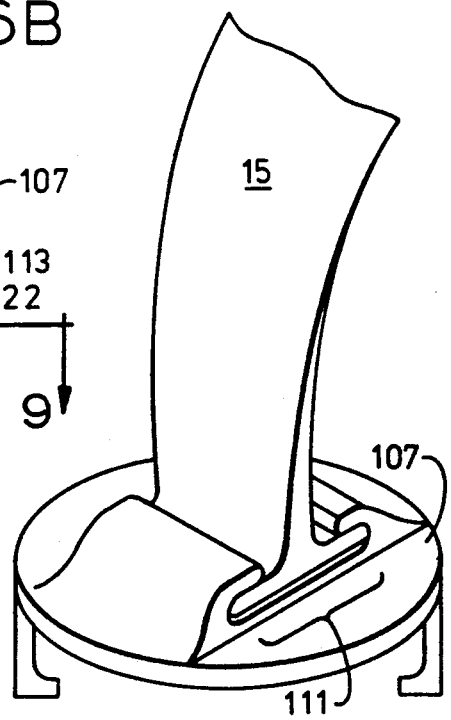
FIG. 6C illustrates mounting of a propeller blade 15 using a dovetail 111.

In FIG. 6, a trunnion 107 carries the propeller blade 15, such as by a dovetail 111 shown in FIG. 6C, or by a blade clevis (not shown) mating with clevis 108 in FIG. 6. A row of bearings 109, which is annular about the pitch axis 110, supports the trunnion 107. The centrifugal load of the propeller blade 15 and trunnion 107 is transmitted to the ring 22P through bearings 109 and race 113 which is supported by an annular flange 115. Shaft 101, also shown in FIG. 6B, delivers the pitch-change torque to the trunnion 107, and a planetary gear system amplifies the torque provided by the shaft 101. The planetary gear system is similar to that of FIG. 6B and includes a sun gear 120, compound planets 126, movable ring gear 147, and fixed ring gear 135. The following additional features are present in the invention of FIG. 6.

FIG. 6 includes a floating support system for the planetary gears. The gear system floats within hub 22B of FIGS. 3A and 6 in order to accommodate misalignment of the gears when it occurs. One type of misalignment results from the centrifugal load of the propeller blade 15 in FIG. 3A, which can deform the hub section 22B. The centrifugal load of the propeller blades can be quite large as an example will illustrate.

EXAMPLE

It is assumed that the diameter of each propeller in FIG. 3 is 12 feet. It is assumed that each fan blade 15 can be treated as a point mass 45 weighing 30 pounds and located on the circumference of a circle 46 which is six feet in diameter. It is also assumed that the speed of rotation is 1200 rpm, or 20 revolutions per second, which corresponds to (2) (pi) (20) radians per second, i.e., about 126 radians per second.

Centrifugal acceleration is equal to $w^2 r$, wherein w is angular velocity (radians per second) and r is radius. In this example, the acceleration is about 47,374 feet per second$^2$:

$$47,374 = [126/\text{sec}]^2 \times 3 \text{ feet}$$

Dividing this number by the acceleration due to gravity, 32.2 feet per seconds, gives a quotient of about 1471. The quotient 1471 is the g field experienced by the point masses 54.

Stated another way, each blade, which originally weighed 30 pounds, now weighs about 44,000 pounds under centrifugal force ($1471 \times 30 = 44{,}130$).

Figure 11:
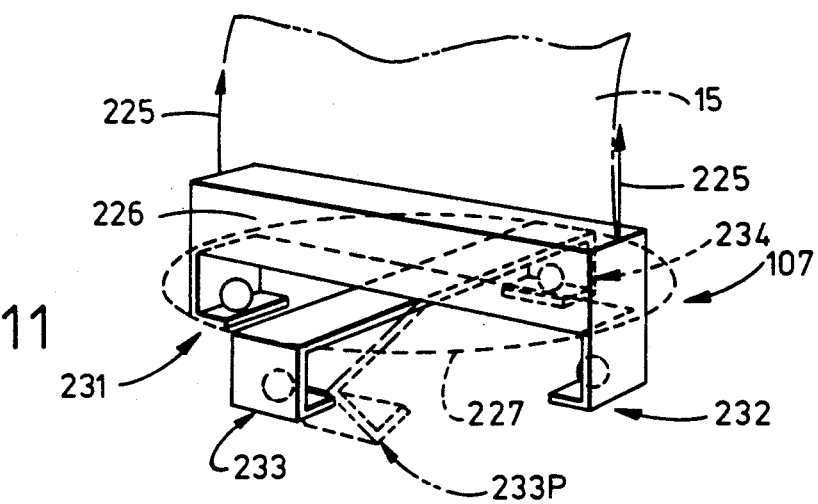
FIG. 11 is a schematic view of the trunnion 107 of FIG. 6.

The centrifugal load can be viewed as acting as forces 225 in FIG. 11, which pull the trunnion 107 in the direction indicated. In FIG. 11, the actual disc-like trunnion of FIG. 6 is indicated by phantom circle 227. For ease of illustrating the hub distortion which occurs, only four regions of the trunnion bearing race are shown, namely, regions 231, 232, 233, and 234. Regions 231 and 232 are stiffened by the blade 15, as indicated by bar 226, while regions 233 and 234 are not.

Consequently, because of the stiffening bar 226, regions 233 and 234 can bend more easily into shapes such as phantom shape 233P than can regions 231 and 232. Thus, it may be imagined that all of the centrifugal load of the blade !5 is carried by regions 231 and 232, which grip the flange 115 in FIG. 12, because regions 233 and 234 bend out of the way.

Figure 12:
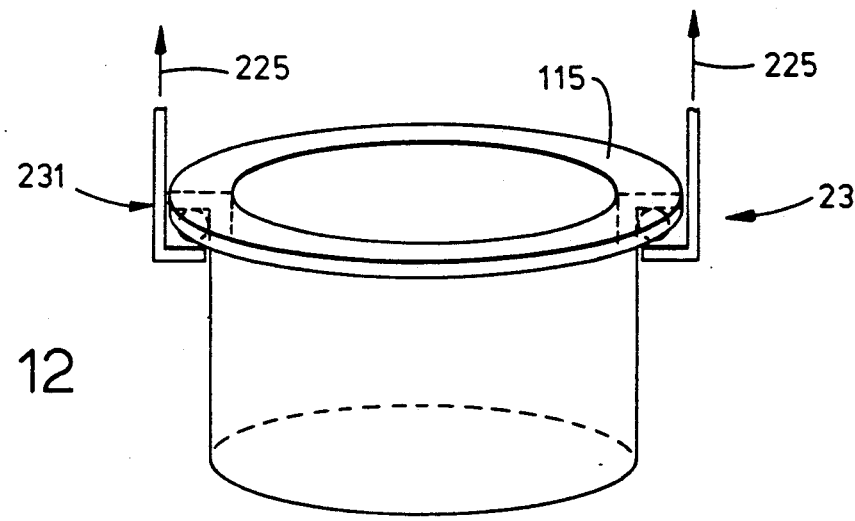
FIG. 12 is a schematic view of two bearing races 231 of FIG. 11 drawing upon the annular flange 115 of FIG. 6.
Figure 13:
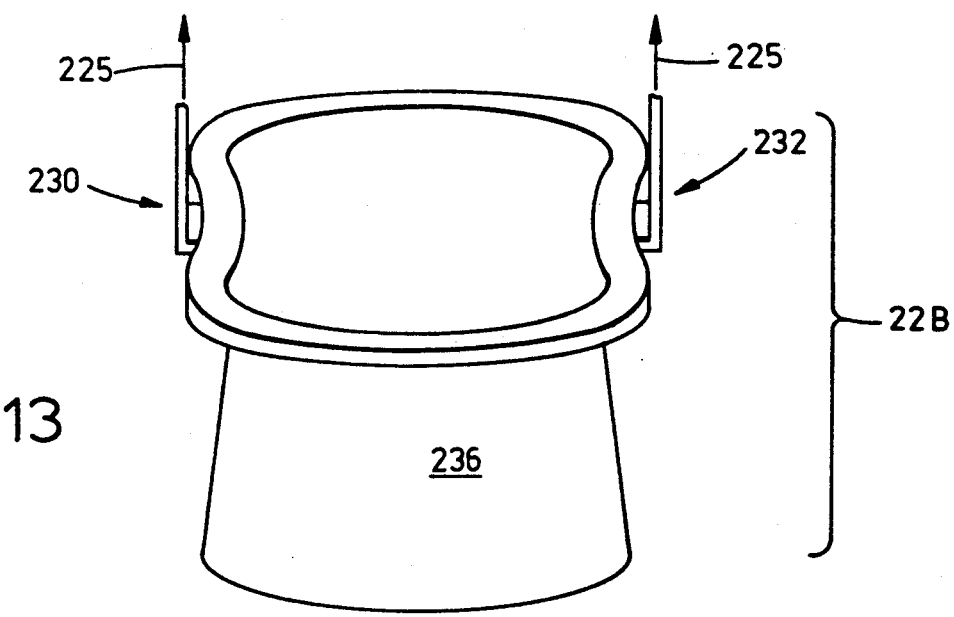
FIG. 13 illustrates, in greatly exaggerated form, deformation of the hub 22B in FIGS. 5 and 6 which can occur under the conditions of FIG. 11.

Thus, the load is not uniformly distributed about annular flange 115 in FIG. 12: the load is concentrated at gripping regions 231 and 232. The nonuniform load distribution causes the hub 22B to deform into the shape shown in greatly exaggerated form in FIG. 13. Further, not only does the hub 22B deform, but the deformation changes during pitch change, because the gripping regions 231 and 232 move around the flange 115, as indicated by arrows 235 in FIG. 12, when pitch change occurs.

The deformation could, in theory, be eliminated by constructing a stouter hub region 22B. However, such construction is not desirable because the centrifugal loads of the blades 15 are so large that a sufficiently stout hub would incur a prohibitive weight penalty. Therefore, instead of eliminating the deformation, the invention accommodates it by using a floating support system.

Figure 14:
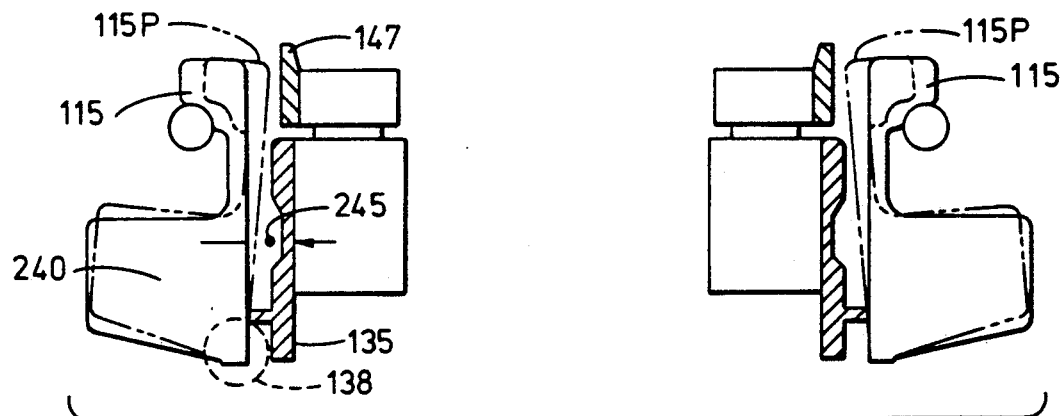
FIG. 14 illustrates how the greatly exaggerated deformation of FIG. 13 fails to affect the operation of the gear system of FIG. 6.
Figure 14A:
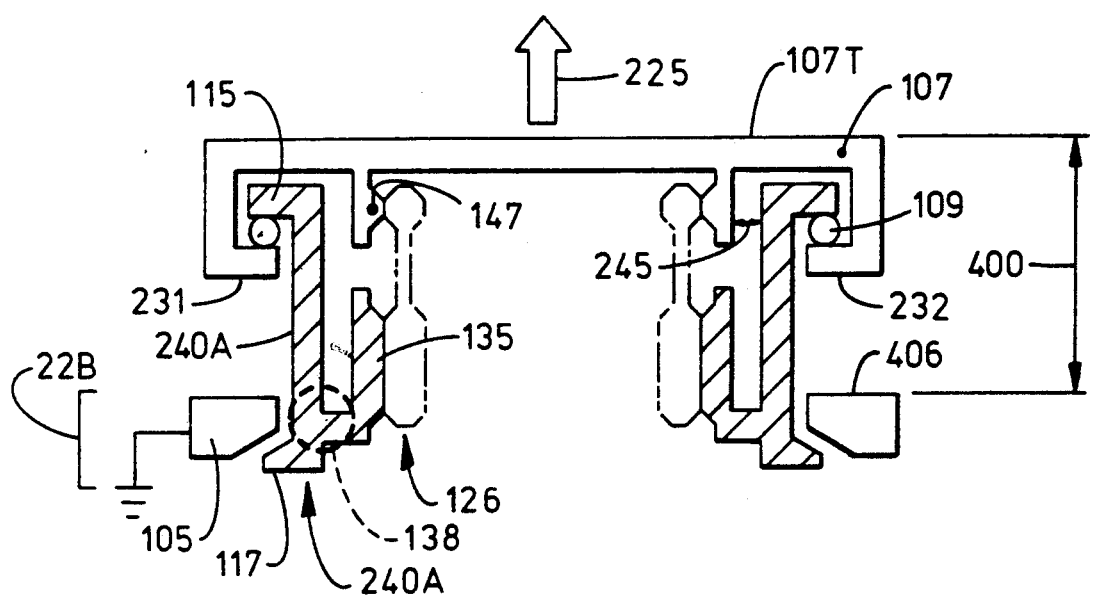
FIG. 14A illustrates schematically the components carrying the centrifugal load of trunnion 107 in FIG. 6.

The floating support system is schematically shown in FIG. 14A. Arrow 225 represents the centrifugal load of the blade and pulls trunnion 107 in the direction indicated. Movement of the trunnion 107 is prevented by bearings 109 which ride on annular flange 115. The annular flange 115 connects to a foot 117 by means of a cylindrical body 240A. Thus, the centrifugal load 225 is transmitted from trunnion 107 to section 105 of the polygonal ring, while trunnion 107 can rotate on bearings 109. The wedge-shaped interface between foot 117 and section 105 transforms part of the centrifugal load 225 into hoop stress in the hub region, because section 105 is annular. A clearance 245 exists between ring gears 135 and 147, and its significance is discussed below.

The floating support system of FIGS. 6 and 14A accommodates the deformation indicated in FIG. 14. When the annular flange 115 deforms to the phantom position 115P, the deformed flange does not significantly disturb the ring gears 135 or 147. Two reasons for the lack of disturbance are the following. First, clearance 245 exists between the ring gears and the hub because (a) stationary ring gear 135 is fastened to the hub at region 138 in FIGS. 6, 14 and 14A, and (b) movable ring gear 147 is fastened to trunnion 107 in FIG. 6. The flange 115 bends into the clearance, and does not touch the ring gears.

Second, the attachment region 138 is deformed much less than is flange 115 because the area moment of inertia of the structure in dashed region 240 (which includes region 138) in FIGS. 6 and 6B is greater than that of region 242 (which includes the flange 115), and thus the former resists bending better than the latter. Further, region 138 is located on the periphery of a circular bulkhead 243 in FIG. 6, which reinforces the annular region 138 and maintains its circular shape.

Figure 6D:
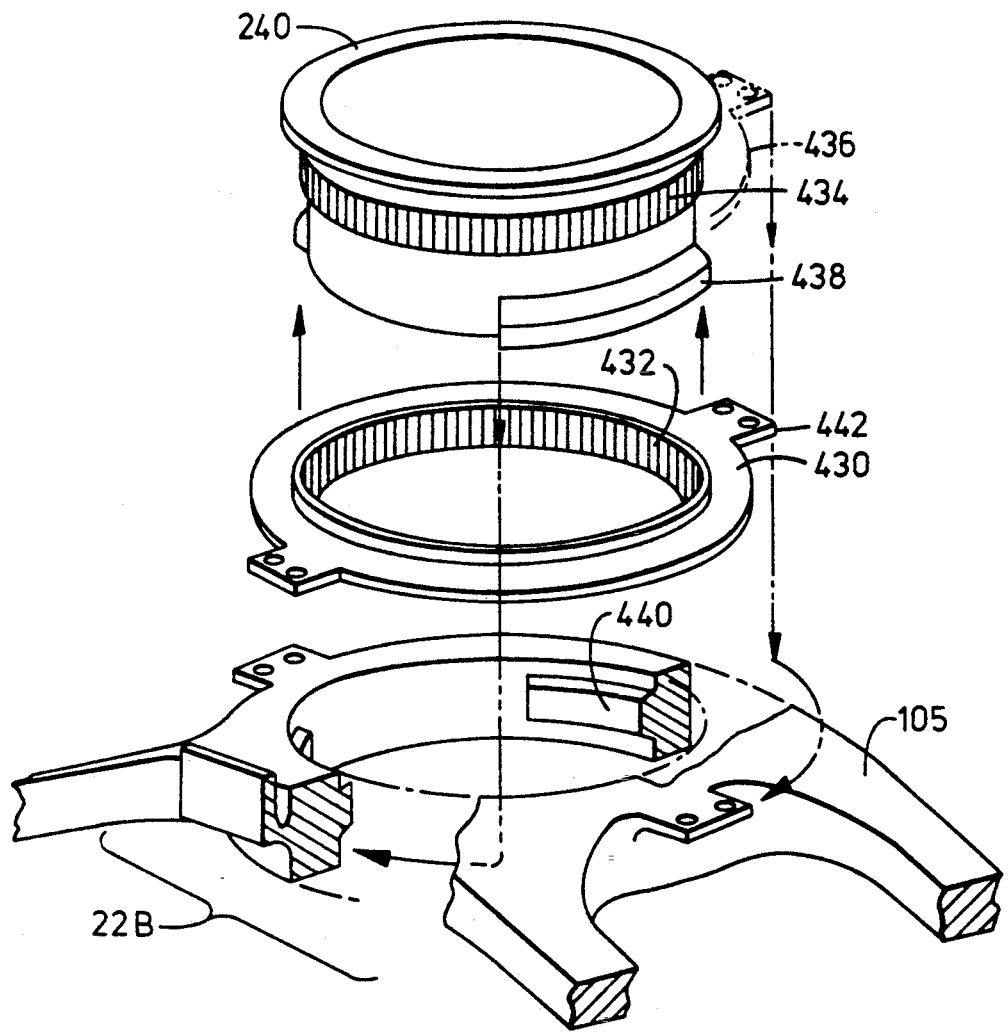
FIGS. 6D, 6E, and 6F illustrate a coupling 240A and a particular way of mounting the coupling to the hub section 22B.

It is noted that the particular construction shown in FIG. 6 differs from that in FIG. 6B. For example, the hub component contained within dashed region 240 in FIG. 6B is split into two components 105 and 240A in FIG. 6, as shown in simplified form in FIG. 14A. This splitting allows the particular method of construction, discussed later, which is shown in FIG. 6D. However, the different styles of construction of FIGS. 6 and 6B do not significantly affect the floating aspects discussed above.

Figure 15:
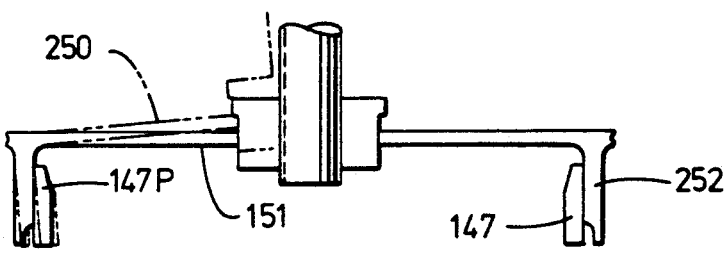
FIG. 15 illustrates bending of web 151 of FIG. 6.

An additional feature which accommodates deformation is that web 151 in FIG. 6B has some characteristics of a diaphragm. These characteristics allow it to deform into phantom position 250 in FIG. 15 if the hub does in fact contact the movable ring gear 147, and allows the movable ring gear 147 to deform to phantom position 147P. Such deformation will dislocate the planet 126 slightly, but will not interfere with the driving of trunnion 107 by sun gear 120.

FIG. 6D will now be explained. A coupling 240A, also shown in FIGS. 6 and 14A, connects the trunnion 107 with the hub section 22B. A ring 430 containing splines 432 is joined with splines 434 on coupling 240A. An annular depression 444 in FIG. 6 allows the ring 430 in FIG. 6D to clear flanges 438, one-at-a-time. When installed on the coupling 240A, the ring 430 occupies phantom position 436.

Figures 6E, 6F:
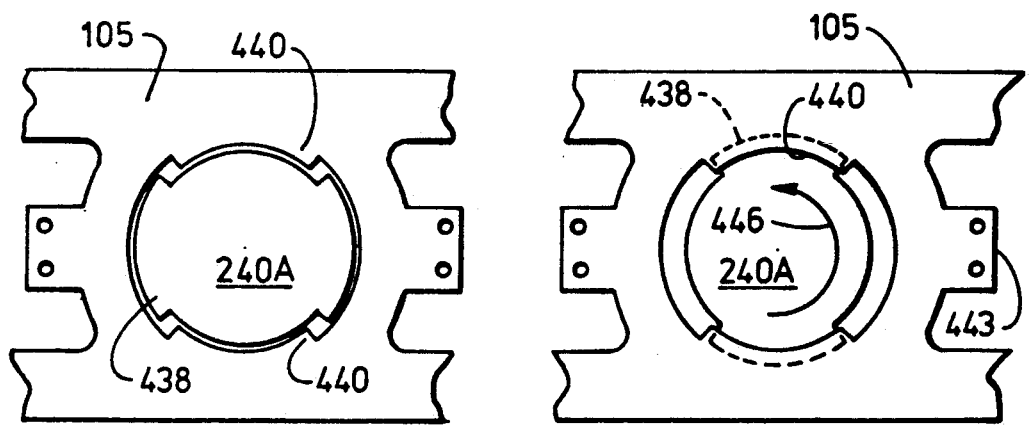

Coupling 240A is inserted into hub 22B, as shown in FIG. 6E, and then rotated as shown by arrow 446 in FIG. 6F until flanges 438 lie beneath flanges 440 attached to the hub 22B. Bolts (not shown) then attach tongues 442 in FIG. 6D with tongue 443 in FIG. 6F. The splined connection prevents the coupling 240A from rotating and assuming the position of FIG. 6E, which allows coupling 240E to be removed from the hub 22B. Flanges 438 and 440 carry the centrifugal load of the blade 15.

Several important aspects of the invention are the following. One. The gear ratio between shaft 101 in FIG. 6, which drives sun gear 120, and the trunnion 107, is about 25 to 1, with shaft 101 having the advantage.

Two. Web 151 in FIG. 6 is fastened to a cylindrical skirt 25 (shown schematically in FIG. 6B) in order to form a lubricant reservoir. (Commonly, in the prior art, sliding surfaces act as a lubricant seal, and such seals can leak under centrifugal load.) An O-ring 256 seals the reservoir, which contains the sun, planet, and both the moveable and stationary ring gears. As indicated above, the centrifugal force of the system can be quite high. For example, if radius 260 in FIG. 6 is two feet, a calculation similar to the one above will indicate that the G-field experienced by the gear system is approximately 986 Gs at 1200 rpm. Consequently, a lubricant, which weighs 0.9 pounds per pint under nonrotating conditions, will weigh 887 pounds per pint when rotating along with the gear at 1200 rpm.

Figures 4, 5:
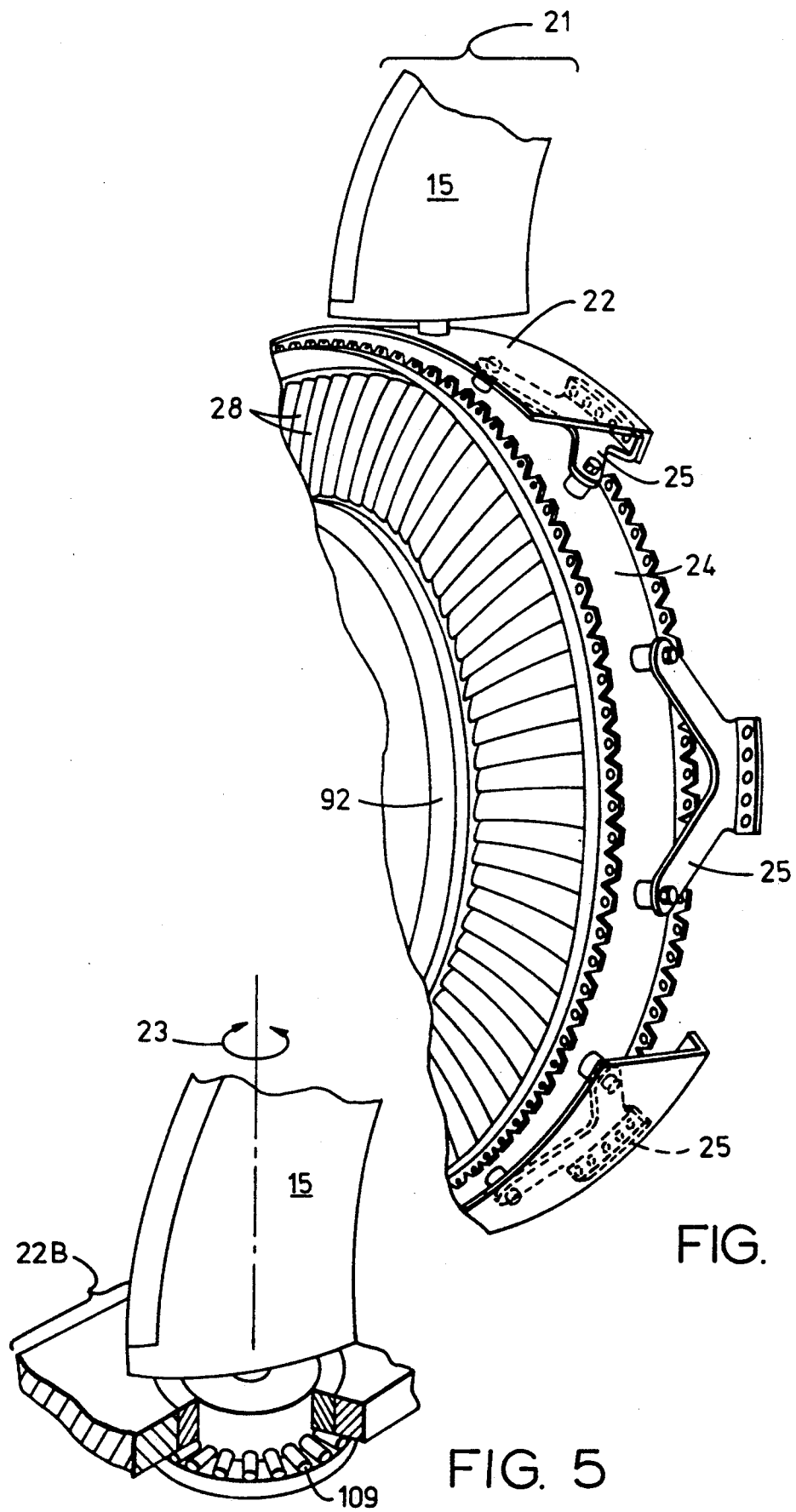
FIG. 4 illustrates part of FIG. 3, in more detail.
FIG. 5 illustrates a hub section of the polygonal ring of FIG. 3A.

It can be desirable to reduce the centrifugal load applied to the polygonal ring 22P in FIG. 5 by this lubricant, and so hollow, annular displacement bodies 450 can be installed in the reservoir defined by the skirt 252 and the web 151. The bodies reduce the total mass of lubricant stored in the reservoir. The displacement bodies 450 can be anchored into annular grooves 455 in FIG. 6B, located on the planet gears 126, by keys 452. The anchorage is necessary because the high density of the lubricant when under centrifugal load would otherwise cause the bodies to float toward the axis of rotation 268.

Three. The bulkhead 243 in FIG. 6 acts as a circular stiffening web and reduces the distortion indicated in FIGS. 13 and 14. That is, the bulkhead serves to maintain the stationary ring gear 135 in a circular condition.

Four. The system of FIG. 6 is located in a hot environment: the temperature at point 275 in FIG. 6 can exceed 400 degrees F. In order to prevent this high temperature from causing thermal degradation of the lubricant contained within the reservoir defined by the skirt 252, the bulkhead may contain an annular chamber which contains thermal insulation 277 in order to reduce heat transfer across the bulkhead.

Five. Each planet gear 126 is hollow, as indicated by space 285 in FIG. 16, in order to save weight. A stopper 290 prevents lubricant entry into the hollow core of the planet gears. Further, each stopper contains a stopper disc 295, also shown in FIG. 6, which acts as a bearing surface for the planet gears. The bearing surface is necessary because the planets are floating in the sense that no cage or retainer fastens them to the ring gear or sun gear, apart from minor support supplied by the keys 452 in FIG. 6B contained on the displacement bodies 450, if the displacement bodies are used.

That is, the planet gears 126 are free to move radially outward until they reach point 152 in FIG. 6. The force against the web can be quite large: if each planet weighs 3 ounces (¼ pound) then the 986-G field causes each to press against the web 151 with a force of 246 pounds.

Figure 17:
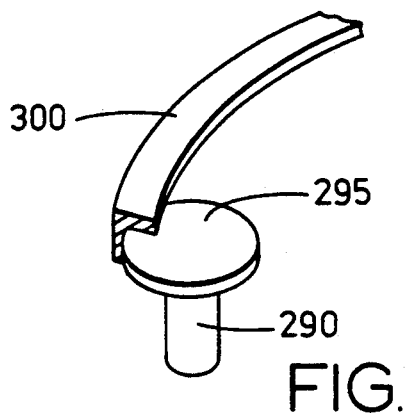
FIG. 17 illustrates in perspective view an annular bearing 300 of FIG. 6 which engages a disc 295 of FIG. 16.

In order to reduce friction between the stopper disc 295 and the web 151, an annular anti-friction bearing 300 in FIGS. 6 and 17 cooperates with thrust disc 295.

Figure 18:
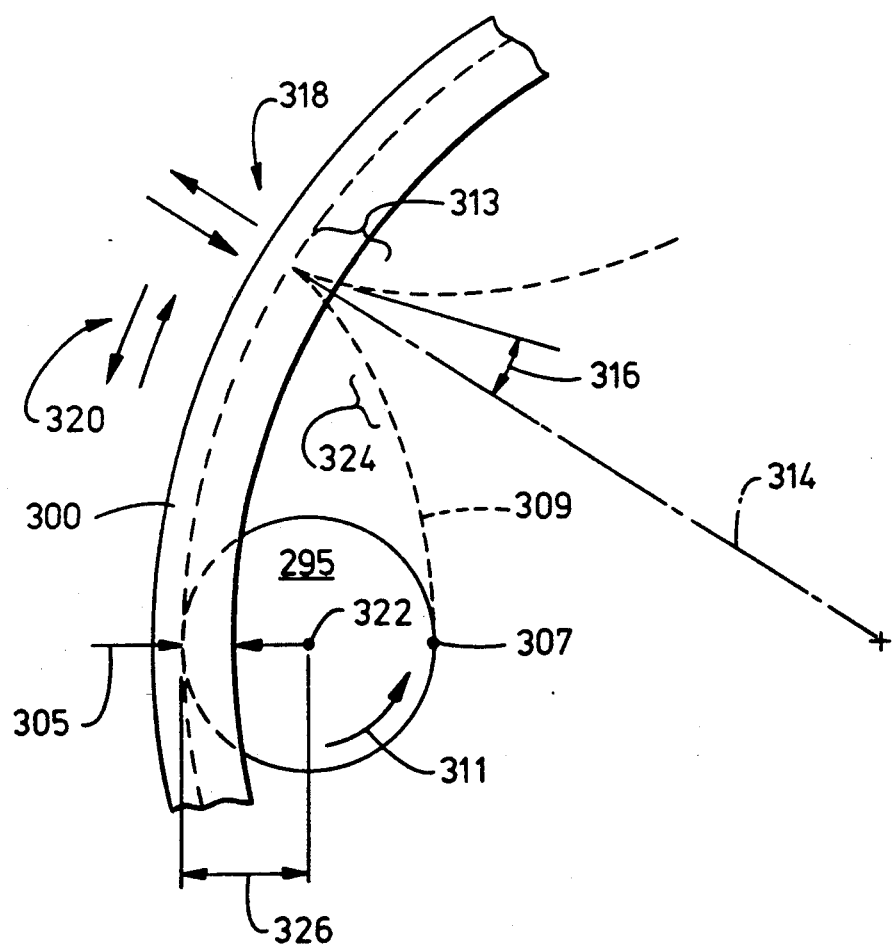
FIG. 18 illustrates relative motion which occurs between the annular bearing 300 and the disc 295 of FIG. 17.

The distance 305 in FIG. 18 by which the annular bearing 300 overlaps the stopper disc 295 is important. Each point on the disc 295, such as point 307, follows a cycloidal path such as path 309, when the disc 295 rotates as indicated by arrow 311. In region 313 of the path, the motion of point 307 is substantially radial, i.e., nearly parallel with radius 314 of the annular bearing 300. Consequently, mutual scrubbing between the disc 295 and the annular bearing 300 is nearly all in the radial directions, as indicated by arrows 318, with little circumferential scrubbing, indicated by arrows 320. The situation would be different, however, if the annular bearing 300 extended to the center 322 of the disc 295, in which case scrubbing would occur at region 324 of the path 309. In such a case, a larger circumferential scrubbing, indicated by arrows 320 will occur.

Six, the distribution of the centrifugal loads of the components in FIG. 6 and 14A is important. The load of the stationary ring gear 135 is carried by the hub 105 because this ring gear is fastened to the hub in region 138. The load of the movable ring gear 147 is carried by the trunnion 107. The loads of the planets 126 are also carried by the trunnion, through the annular bearing 300. The load of the sun gear 120 in FIG. 6 is carried by shaft 101, the load of which is, in turn, carried by one of the turbines 9 or 12 in FIG. 2, by an attachment which is not shown.

Figure 8:
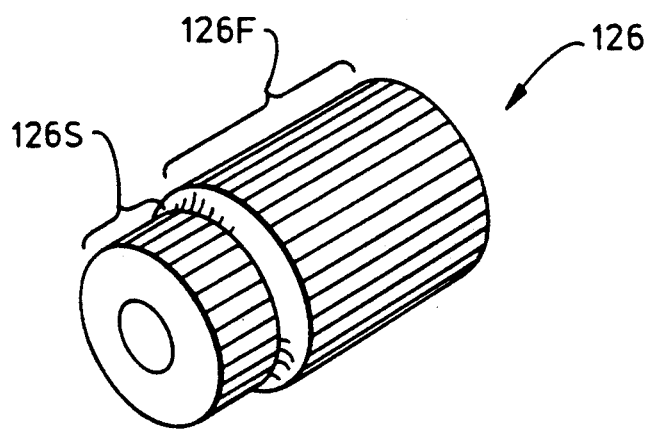
FIG. 8 illustrates a compound planet gear 126 of FIGS. 6 and 7.

Seven. The planetary system of the invention (shown in FIG. 7, for example) has been described as having compound planets as shown in FIG. 8. However, it is not necessary that the planets be compound; it is only necessary that a different gear ratio exist between fixed ring gear 135 and sub-planet 126F as compared with the ratio between movable ring gear 147 and subplanet 126S.

Eight. The form of the invention shown in FIG. 14A can be viewed as including a post 240A which extends from the hub section 22B of the polygonal ring. The post 240A and the trunnion 107 provide a clearance 400 between the top surface 107T of the trunnion 107 and the top surface 406 of the hub 22B. The clearance is useful because other components, such as cowling 402 in FIG. 2, or mounting hardware (not shown) for the cowling 402, may need to be located in the space between the root 404 of the blade and the top 406 of the hub 22B. Without such clearance 400 in FIG. 14A, other means may be required, such as shaft 407 in FIG. 3A, to separate the blade 15 from the hub 22B.

The posts 240A in FIG. 14a, when installed in the polygonal ring 22 in FIG. 3A, form a radial array. That is, each post is aligned generally with a radius of the polygonal ring, and arrayed along the circumference, similar to the petals on a sunflower, which form a radial array.

Nine, scrubbing between the disc 295 and annular bearing 300 was discussed above. Alternately, the top of disc 295 can be hemispherical, and the mating surface on bearing 300 can be conical about axis 110. With this configuration, the contact between the two is a theoretical point, and, in practice, will become elliptical because of deformation under load.

This elliptical contact reduces friction and wear because of the reduced area in the ellipse and because the instant center of rotation lies within the bounds of the ellipse. Further, the size and shape of the elliptical contact region is now under the control of the designer, which allows adjustment of the contact stress and friction levels. Still further, the localized nature of the elliptical contact tolerates misalignment between the disc 295 and annular bearing 300.

Figure 16:
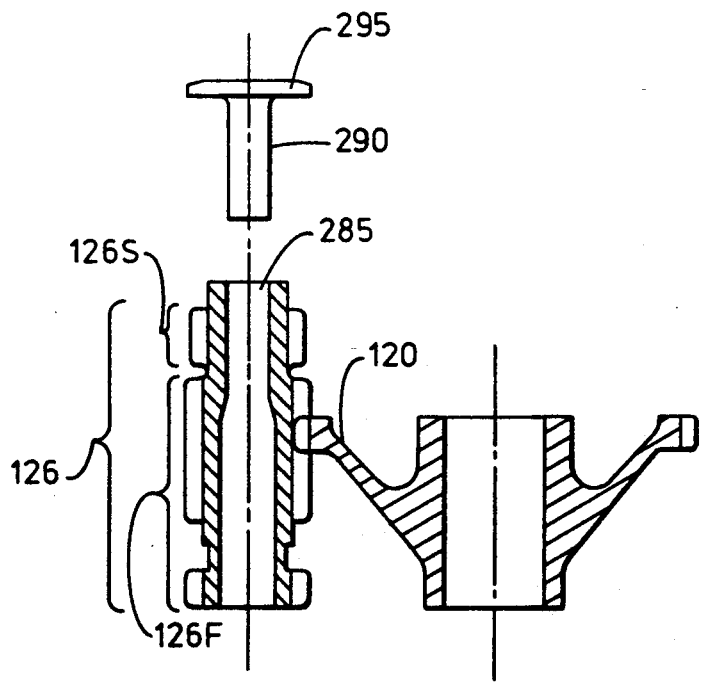
FIG. 16 illustrates a planet gear 126 and a stopper 290 of FIG. 6.

Ten, planet sections 126FF in FIG. 16 have longer face widths than gear 120. This allows gear 120 to engage the planet at any of several possible locations, thus allowing shaft 101 in FIG. 6B to move radially, and yet deliver torque to the planets. Such motion occurs during normal operation, as when centrifugal loading drives the polygonal ring 22P in FIG. 3A outward. Such motion also occurs when the supports for shaft 101 grow thermally, driving gear 120 in FIG. 6B radially outward. Such motion also occur can occur during a malfunction, when the entire assembly of FIG. 6B, with the exception of shaft 101, moves radially.

Numerous substitutions and modifications can be undertaken without departing from the true spirit and scope of the invention as defined in the following claims. For example, the propellers described above are directly driven by turbines. However, motive power provided by direct turbine drive is not necessary, and a high-speed turbine driving propellers through a speed-reducing gearbox could be used. The gearbox can be located either forward or aftward of the gas generator.

Numerous substitutions and modifications can be undertaken without departing from the true spirit and scope of the invention. What is desired to be secured by Letters Patent is the invention as defined in the following claims.

We claim:

1. An aircraft propeller system, comprising:
    a) a radial array of posts affixed to an annular carrier wherein said posts are hollow:
    b) a trunnion rotatably attached to each post;
    c) a propeller blade attached to each trunnion;
    d) a reduction gear set contained within each hollow post for amplifying torque applied to each trunnion wherein the reduction gear set comprises:
        i) a first ring gear attached to the post;
        ii) a second ring gear attached to the rotatable trunnion;

iii) a plurality of planet gears engaging the first and second ring gears at different gear ratios; and iv) means for driving the planet gears for causing pitch change of the propeller blade attached to the trunnion.

2. An aircraft propeller system, comprising:
a) an annular blade carrier including a plurality of blade hub sections;
b) a plurality of hollow couplings, each extending radially outward from the carrier;
c) means for preventing rotation of each hollow coupling with respect to the carrier, said means comprising
   (i) one or more tongues fixedly attached to each of said blade hub sections,
   (ii) a splined ring which surrounds each of said hollow couplings and which mates with splines on said hollow couplings, and
   (iii) wherein said splined ring includes one or more tongues, said splined ring tongues fixedly attached to said blade hub section tongues;
d) a trunnion rotatably carried by each hollow coupling;
e) a propeller blade carried by each trunnion; and
f) a reduction gear set located within each coupling for amplifying torque applied to each trunnion.

3. An aircraft propeller system, comprising:
a) an annular carrier having a plurality of apertures therethrough, extending from a radially inner surface of said annular carrier to a radially outer surface of said annular carrier;
b) a trunnion located concentric with and surrounding each aperture at said annular carrier radially outer surface;
c) a removable coupling extending between each trunnion and its respective aperture, comprising a bearing system which is rotatably converted to said trunnion thereby allowing pitch change;
d) a gear system located within each coupling for amplifying torque provided by a source, said gear system comprising:
   i) a first ring gear affixed to the coupling;
   ii) a second ring gear connected to the trunnion;
   iii) a plurality of planet gears engaging the first and second ring gears at different ratios; and
   iv) means for driving the planet gears in order to cause pitch change.

4. An aircraft propulsion system, comprising:
a) an annular carrier;
b) a plurality of trunnions rotatably attached to the carrier;
c) a respective planetary gear set driving each trunnion, and comprising:
   i) a first ring gear attached to the rotatable trunnion;
   ii) a second ring gear attached to the carrier;
   iii) a plurality of planet gears engaging the first and second ring gears at different gear ratios; and
   iv) a sun gear driving the planets for driving the planet gears such that the sun gear has a mechanical advantage over the trunnion.

5. A system for attaching propeller blades to an annular carrier, comprising:
a) a plurality of connectors, each
   i) mating with a respective aperture in the carrier,
   ii) having a first enlargement for preventing withdrawal from the aperture;
   iii) having a second enlargement located radially outward from the first enlargement;
b) a trunnion rotatably attached to each second enlargement such that centrifugal force cannot remove each trunnion;
c) a propeller blade attached to each trunnion;
d) a means for preventing rotation of each connector with respect to the carrier, said means comprising
   i) a splined ring which surrounds each of said connectors and which mates with splines on said connectors, and
   ii) wherein said splined ring includes one or more tongues, said splined ring tongues fixedly attached to mating tongues on the carrier; and
e) a reduction gear set located within each connector for amplifying torque applied to each trunnion.

6. In an aircraft propulsion system, a pitch change mechanism comprising:
a) a ring which supports a plurality of rotatable trunnions, each of which carries a respective propeller blade;
b) a plurality of planetary gear sets, each driving a respective trunnion, and each of which includes
   i) a first ring gear which is stationary with respect to the ring;
   ii) a second ring gear which is movable with respect to the ring and drives the trunnion; and
   iii) a plurality of compound planet gears which engage both the first and second ring gears wherein the centrifugal load of the first ring gear and the trunnions is borne by the ring, and the centrifugal load of the second ring gear and the planetary gears is borne by the trunnion; and
c) an array of shafts, each of which bears a sun gear which drives the planet gears in a respective planetary gear set.

7. A pitch change mechanism according to claim 6, wherein:
a) each of said compound planet gears include a hollow core for weight reduction purposes and further include a stopper slidingly engaged with said core on a radially outer end to prevent lubricant from entering said core;
b) said stopper includes a hemispherical disc affixed to a radially outer end;
c) said compound planet gears are free to move radially outward causing said hemispherical stopper disc to contact a conical annular bearing, resulting in an elliptical contact area between said hemispherical stopper disc and said conical annular bearing, said elliptical contact area reducing friction and wear between said hemispherical stopper disc and said conical annular bearing.

8. Apparatus for use within an aircraft propulsion system, comprising:
a) a support ring for supporting a plurality of propeller blades and which includes a plurality of hub regions which are deformed by forces applied by the propeller blades, each hub region having a hole therethrough;
b) a plurality of reducing gears, each partly occupying one of the holes and separated from its hole by an annular space thereby substantially isolating the reducing gears from hub deformation; and
c) a plurality of lubricant reservoirs, one for each gear set and contained within a respective hub region thereby encapsulating the reduction gears and comprising;

i) a web;
ii) a cylindrical skirt; and
iii) an O-ring seal.

9. Apparatus according to claim 8 wherein:
a) said reducing gears include a plurality of planet gears, each containing an annular groove;
b) said apparatus further comprises displacement bodies, each including a key, said key anchored into one of said annular grooves, thereby reducing a lubricant-carrying capacity of said reservoirs and the associated centrifugal loads applied to the support ring.

10. Apparatus according to claim 8 in which each reducing gear comprises a planetary system which includes
i) a sun gear;
ii) a first ring gear surrounding the sun gear and affixed to the support ring;
iii) a plurality of first planet gears engaging the sun gear and the ring gear;
iv) a second ring gear connected to a pitch-changeable propeller blade; and
v) a plurality of second planet gears, each connected to a respective one of the first planet gears and each engaging the second ring gear, wherein the first and second planet gears engage the first and second ring gears, respectively, at different gear ratios.

11. An aircraft propeller system, comprising:
a) a polygonal ring having a plurality of outwardly facing apertures with one or more aperture flanges in each;
b) a generally cylindrical coupling which
   i) mates with each respective aperture;
   ii) has one or more coupling flanges which engage the aperture flanges for preventing removal of the coupling under the influence of centrifugal force and which can disengage the aperture flanges by rotation of the coupling; and
   iii) is generally coaxial with a radius of the polygonal ring;
c) a circular bearing race coaxial with, and fastened to the radially outer end of, each respective coupling;
d) a trunnion rotatably attached to each respective bearing race by means of bearing rollers;
e) a propeller blade carried by each respective trunnion;
f) a first ring gear affixed to the rotatable trunnion, and separated from the coupling by an annular space;
g) a second ring gear affixed to the coupling and separated from the coupling by an annular space, except at the radially innermost region of the second ring gear;
h) a plurality of planet gears engaging the first and second ring gears at different gear ratios; and
i) a sun gear for driving the planet gears for causing pitch change of the propeller blade.

12. Apparatus according to claim 11 and further comprising a splined ring which mates with splines on the coupling and prevents rotation of the coupling which would allow disengagement of the coupling flanges from the aperture flanges.

* * * * *